United States Patent [19]
Koichi et al.

[11] Patent Number: 6,092,942
[45] Date of Patent: *Jul. 25, 2000

[54] PRINTING DEVICE, PRINTING METHOD, IMAGE FORMING APPARATUS AND IMAGE FORMING METHOD

[75] Inventors: Oka Koichi; Tatsuo Hayashi, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,759
[22] PCT Filed: Apr. 25, 1997
[86] PCT No.: PCT/JP97/01464
  § 371 Date: Mar. 23, 1998
  § 102(e) Date: Mar. 23, 1998
[87] PCT Pub. No.: WO97/39898
  PCT Pub. Date: Oct. 30, 1997

[30] Foreign Application Priority Data

Apr. 25, 1996 [JP] Japan .................................... 8-105571

[51] Int. Cl.[7] .................................................. B41J 2/315
[52] U.S. Cl. .......................... 400/120.02; 400/76; 400/70; 400/61
[58] Field of Search ............................ 400/120, 120.02, 400/76, 70, 61

[56] References Cited

U.S. PATENT DOCUMENTS

| | | | |
|---|---|---|---|
| 4,815,872 | 3/1989 | Nagashima | 400/120 |
| 5,410,642 | 4/1995 | Hakamatsuka et al. | 395/113 |
| 5,473,144 | 12/1995 | Maturin, Jr. | 235/380 |
| 5,478,157 | 12/1995 | Kohno et al. | 400/120.02 |
| 5,527,759 | 6/1996 | Oshima et al. | 503/227 |
| 5,856,048 | 1/1999 | Tahara et al. | 430/1 |

Primary Examiner—John S. Hilten
Assistant Examiner—Charles H. Nolan, Jr.
Attorney, Agent, or Firm—Jay H. Maioli

[57] ABSTRACT

A printing method for producing a print having large visual effects mat processing the surface of a print made by an ink ribbon and a thermal transfer head. The images of color components of yellow, magenta, and cyan 52 are sequentially formed on a printing paper 23, and thereafter, a lamination film 53 is stuck to the entire image face in the same process. At this time, a silk texture or random concave-convex pattern is formed on the lamination film 53 and the mat processing having the large visual effects is performed.

20 Claims, 12 Drawing Sheets

DDh
BBh

2560 BITS
8 BITS
{6Bh, 29h, 64h, CDh, ⋯⋯⋯
4Dh, 59h, 4Bh, 6Ch, ⋯⋯⋯
72h, ⋯⋯⋯
8 BITS { DDh, ⋯⋯⋯

48h ⋯⋯⋯
BCh, ⋯⋯⋯
4Ch, ⋯⋯⋯
2Bh, ⋯⋯⋯

90

6Bh, 29h, 64h, CDh, ⋯⋯⋯

105 DOT DATA ON THIRD LINE
104 LINE DATA ON THIRD LINE
103 DOT DATA ON SECOND LINE
102 LINE DATA ON SECOND LINE
101 DOT DATA ON FIRST LINE
100 LINE DATA ON FIRST LINE

PRINTING DEVICE, PRINTING METHOD, IMAGE FORMING APPARATUS AND IMAGE FORMING METHOD

TECHNICAL FIELD

This invention relates to a printing device and more particularly relates to a printing device for printing a color image on e.g., a sheet-shaped printing medium.

BACKGROUND ART

A color printer of a sublimating type is conventionally proposed. In this color printer, a color image is formed on a card-shaped printing medium by sublimating yellow, magenta and cyan inks arranged on an ink ribbon by a thermal head. A dye on the card-shaped printing medium having the color image formed by this printer is weak in oil component attached to a finger. Japanese Laid-Open Patent No. 7-52428 discloses a card-shaped printing device for protecting this weak dye. In this card-shaped printing device, laminate data are read from a laminate memory storing the laminating data of one frame thereto and a laminate film is then transferred. However, in this conventional sublimating color printer, the laminate data stored to the laminate memory are set to data of one frame as in image data of the YMC. Accordingly, it is necessary to arrange a frame memory having a capacity of one frame as in a frame memory for storing the image data of the YMC as the laminate memory for storing the laminate data.

Further, in the conventional printer for forming such a film on the printing medium, one kind of pattern can be formed on the printing medium, but no plural kinds of patterns can be formed on the printing medium. A frame memory is required for every plural pattern to form the plural laminate patterns on the printing medium by using the conventional printer. Therefore, a problem exists in that the printing device becomes expensive since cost of these plural frame memories is required.

DISCLOSURE OF THE INVENTION

In a printing device of this invention, a predetermined printing operation is performed on a printing face of a predetermined printing medium with a color ink arranged on an ink ribbon and a film-shaped sheet arranged adjacent to said color ink on the ink ribbon is transferred onto said printing face by a thermal transfer head, a desirable concave-convex pattern is formed by providing a memory for storing a concave-convex pattern to be transferred to said film-shaped sheet on its entire printing face and by reading said concave-convex pattern stored in said memory in accordance with a predetermined algorithm, and is transferred onto said printing face.

The printing device of this invention forms, in the above arrangement, a silk texture shape concave-convex pattern.

The printing device of this invention forms, in the above arrangement, a random concave-convex pattern by changing a reading line at every line on the basis of the concave-convex pattern stored in said memory.

The printing device of this invention changes, in the above arrangement, a reading starting dot at every line on the basis of the concave-convex pattern stored in said memory.

In the printing device of this invention, in the above arrangement, plural kinds of concave-convex patterns are stored in said memory, and one of the above plural concave-convex patterns is read by the selection of an operator.

In a printing method of this invention, a predetermined printing operation is performed on a printing face of a predetermined printing medium, with a color ink arranged on an ink ribbon and a film-shaped sheet arranged adjacent to said color ink on the ink ribbon, the color ink is transferred onto said printing face by a thermal transfer head. A desirable concave-convex pattern is formed by storing a concave-convex pattern to be transferred to said film-shaped sheet on its entire printing face and by reading said stored concave-convex pattern in accordance with a predetermined algorithm, and is transferred onto said printing face.

The printing method of this invention forms, in the above method, a silk texture shape concave-convex pattern.

The printing method of this invention forms, in the above method, a random concave-convex pattern by changing a reading line at every line on the basis of said stored concave-convex pattern.

The printing method of this invention changes, in the above method, a reading starting dot at every line on the basis of said stored concave-convex pattern.

In the printing method of this invention, in the above method, plural kinds of concave-convex patterns are stored, and one of these plural concave-convex patterns is read by the selection of an operator.

An image forming apparatus of this invention is an image forming apparatus for forming an image on a printing sheet. It comprises an image transfer means for transferring a color image onto said printing sheet; a film transfer means for transferring a transparent sheet onto an upper face of the printing sheet having the color image transferred by said image transfer means; a memory means for storing a concave-convex pattern formed with respect to the transparent sheet transferred onto said printing sheet by said film transfer means; and a control means for controlling an operation of said memory means so as to read pattern data of said memory means as lamination printing data in accordance with a predetermined algorithm and controlling an operation of said film transfer means such that the transparent film transferred onto the printing sheet having said formed color image becomes a film having a surface formed in a concave-convex shape in accordance with said read lamination printing data.

In the image forming apparatus of this invention, in the above arrangement, said predetermined algorithm is an algorithm in which an arithmetic operation for determining which part of the pattern data stored in said memory means is used as said lamination printing data is performed on the basis of said pattern data themselves.

In the image forming apparatus of this invention, in the above arrangement, said predetermined algorithm has a first arithmetic operation for determining which line of the pattern data stored in said memory means is used as said laminate printing data, and a second arithmetic operation for determining which dot data on a line designated in said first arithmetic operation are set to first dot data of said laminate printing data.

In the image forming apparatus of this invention, in the above arrangement, said first arithmetic operation and said second arithmetic operation are arithmetic operations performed by using data included in the pattern data themselves stored in said memory means.

In the image forming apparatus of this invention, in the above arrangement, said lamination printing data are random data.

An image forming method of this invention is an image forming method for forming an image on a printing sheet comprises a first step for forming a color image on said printing sheet; a second step for reading predetermined pattern data stored in a memory as lamination printing data in accordance with a predetermined algorithm; and a third step for transferring a transparent film having a concave-convex surface based on the lamination printing data read in said second step onto the printing sheet having the color image formed in said first step.

In the image forming method of this invention, said predetermined algorithm is an algorithm in which an arithmetic operation for determining which part of the pattern data stored in said memory means is used as said lamination printing data is performed on the basis of said pattern data themselves.

In the image forming method of this invention, said predetermined algorithm is constructed by a first arithmetic operation for determining which line of the pattern data stored in said memory means is used as said laminate printing data, and a second arithmetic operation for determining which dot data on the line designated in said first arithmetic operation are set to first dot data of said laminate printing data.

In the image forming method of this invention, said first arithmetic operation and said second arithmetic operation are an arithmetic operation performed by using data included in the pattern data themselves stored in said memory means.

In the image forming method of this invention, in the above method, said lamination printing data are random data.

FIG, 2 is a view showing a printing mechanism according to this embodiment.

Figure 3:
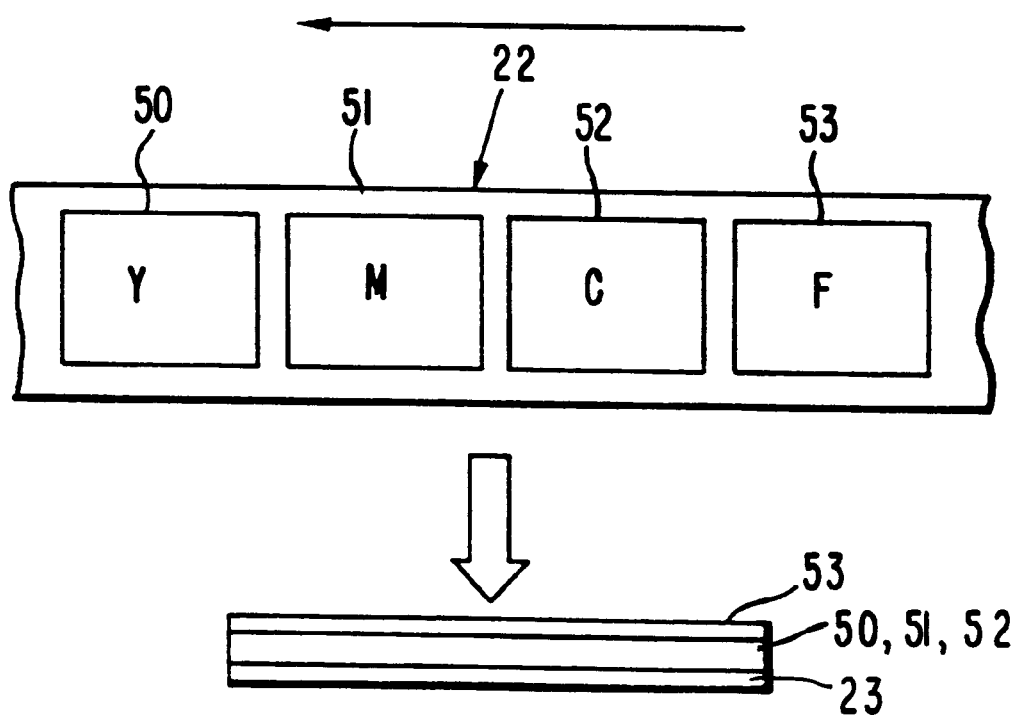

FIG. 3 is a diagram for explaining a printed image according to this embodiment.

Figure 4:
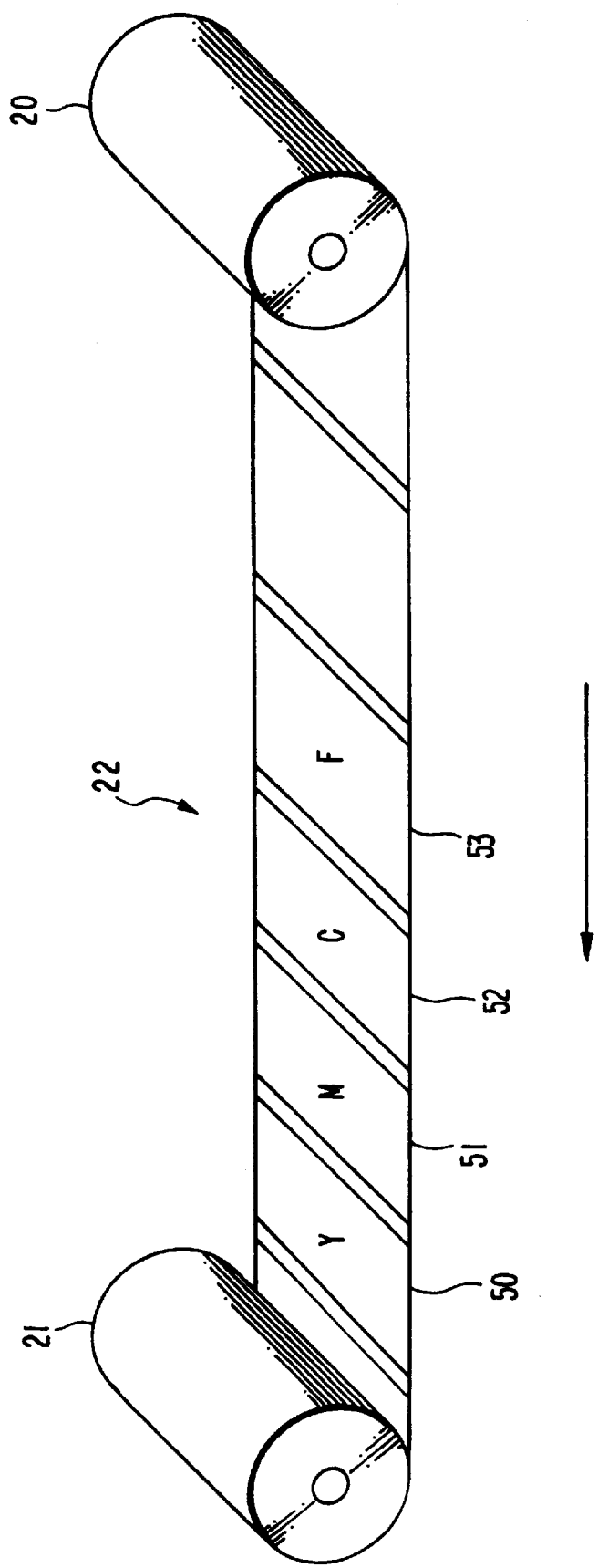

FIG. 4 is a view showing a ribbon according to this embodiment.

Figure 5:
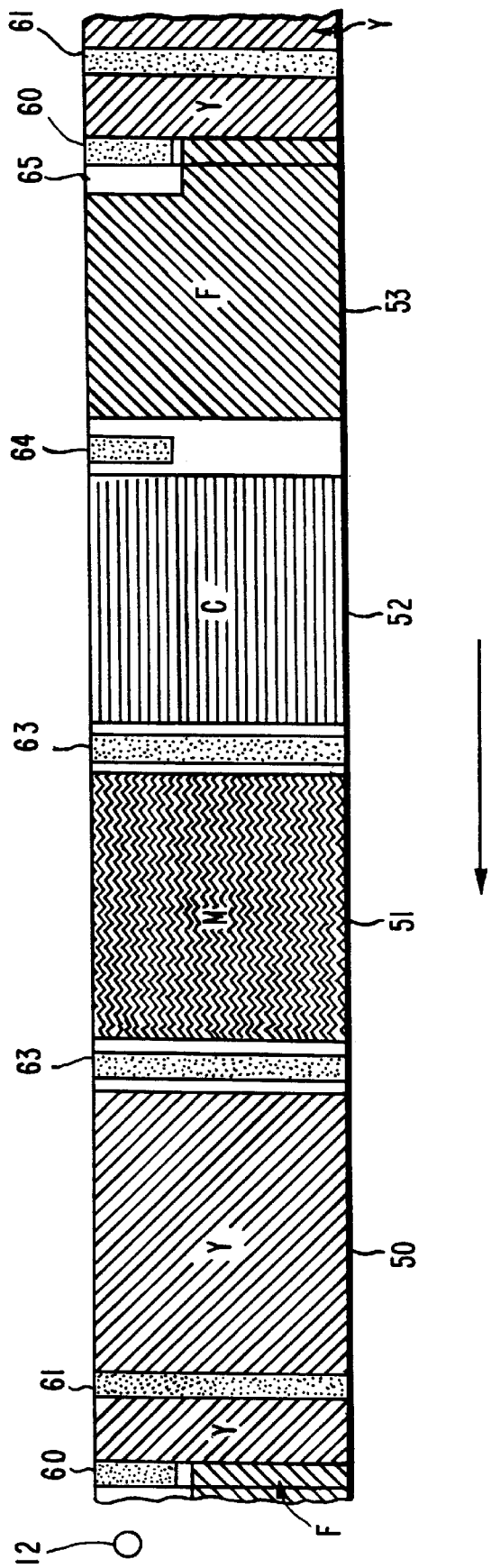

FIG. 5 is a diagram showing a detecting operation of the ribbon according to this embodiment.

Figure 6:
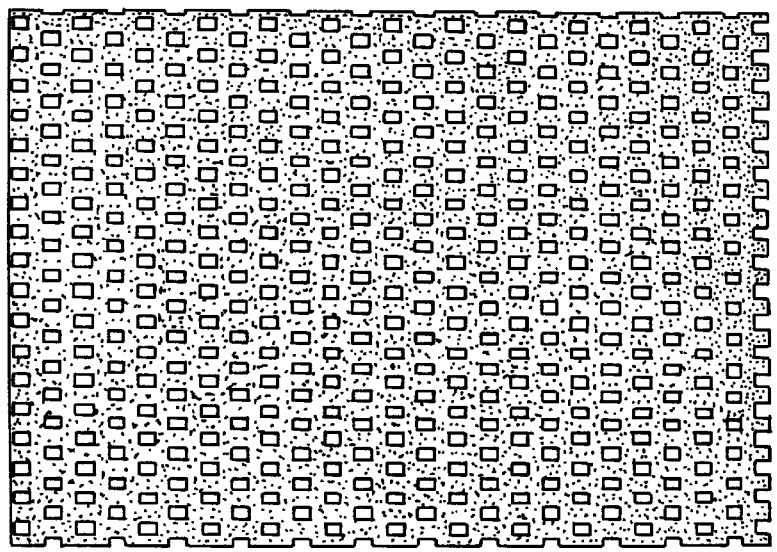

FIG. 6 is a diagram showing a silk pattern formed on a lamination film transferred to a printing paper according to this embodiment.

FIG. 7 is a diagram showing a minimum unit (A) of the silk pattern of this embodiment and printing data (B) made from a series of the minimum units.

FIG. 8 is a diagram showing a transversal or longitudinal central line symmetry (A) of the minimum unit of another silk pattern according to this embodiment and a diagonal line symmetry (B).

Figure 9:
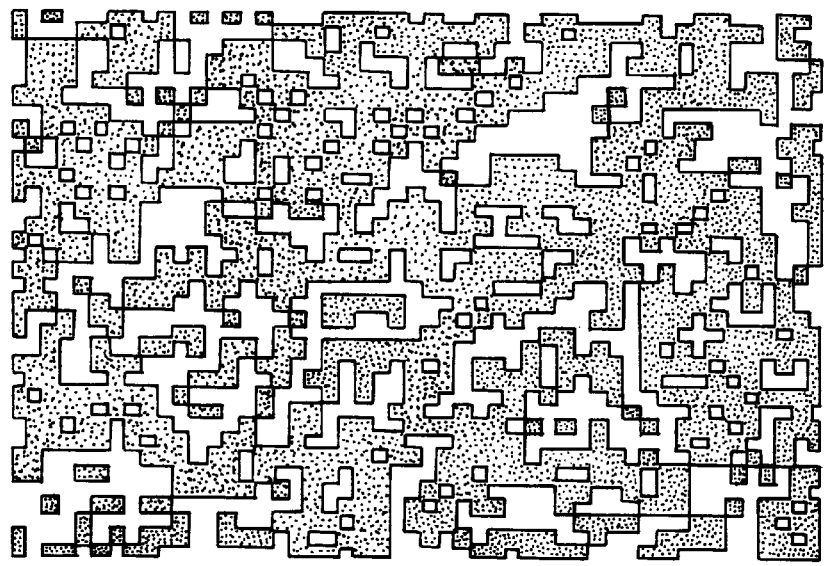

FIG. 9 is a diagram showing a random pattern formed on the lamination film transferred to the printing paper according to this embodiment.

Figure 10:
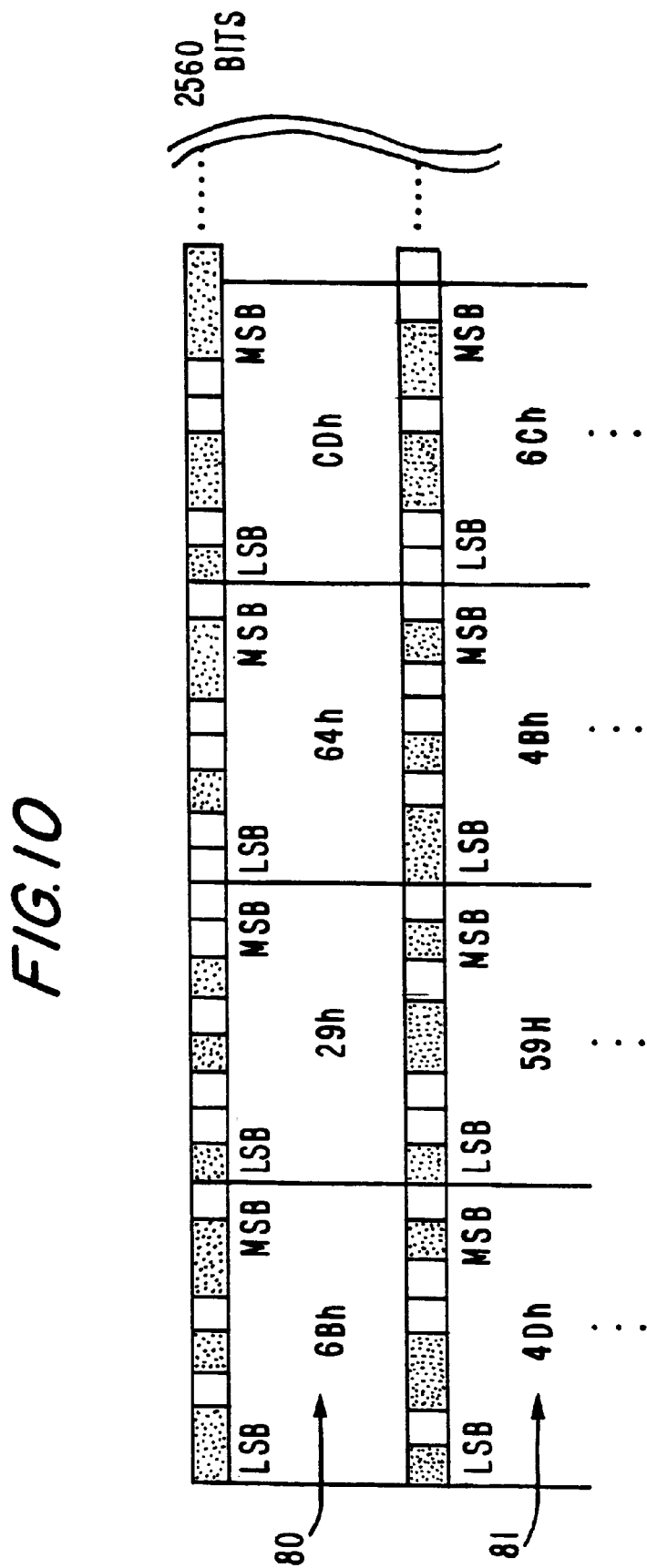

FIG. 10 is a diagram showing compressed data stored on a RAM according to this embodiment.

FIG. 11 is a diagram showing pattern data (A) for forming the silk pattern stored on the RAM of this embodiment and pattern data (B) for forming the random pattern.

Figures 11A, 11B, 12:
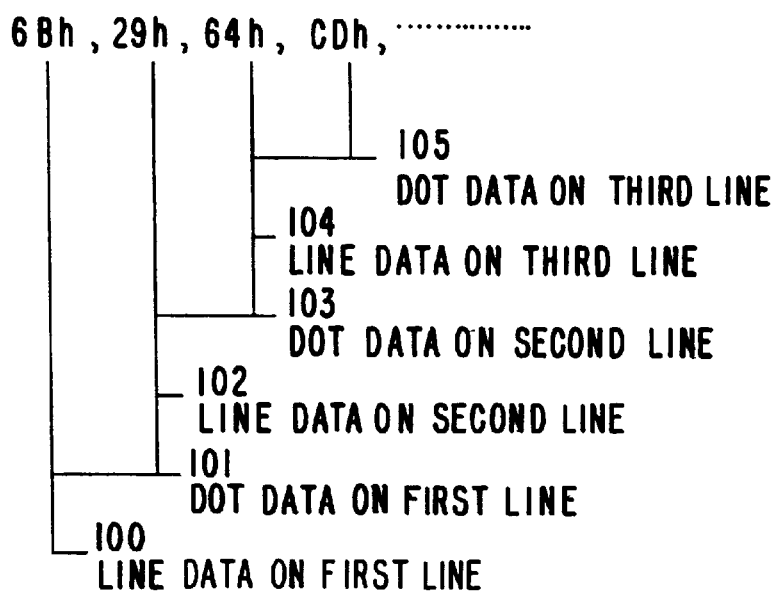

FIG. 12 is a diagram showing the determination of lamination printing data according to this embodiment.

Figure 13:
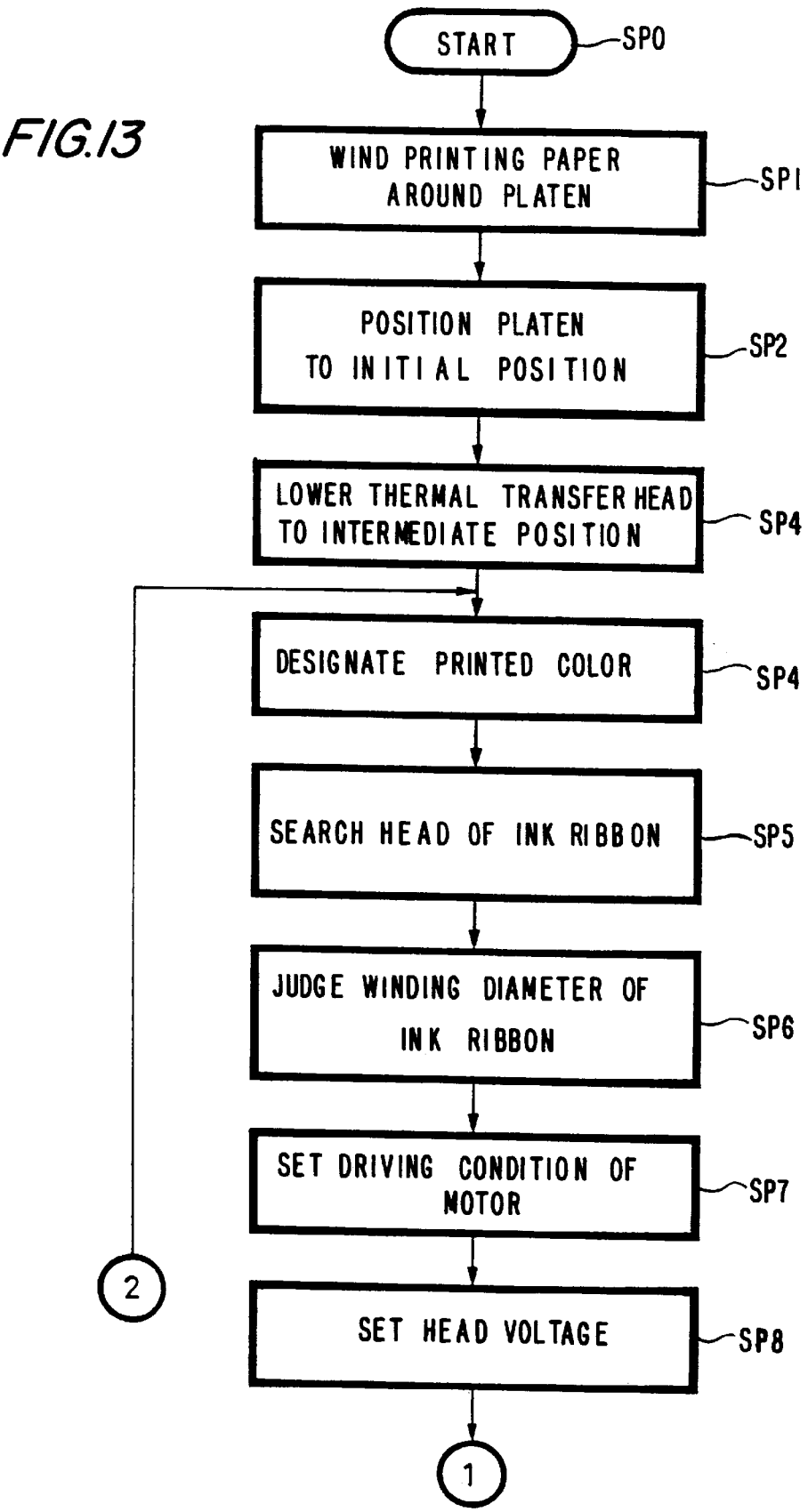

FIG. 13 is a flow chart showing a printing operation according to this embodiment.

Figure 14:
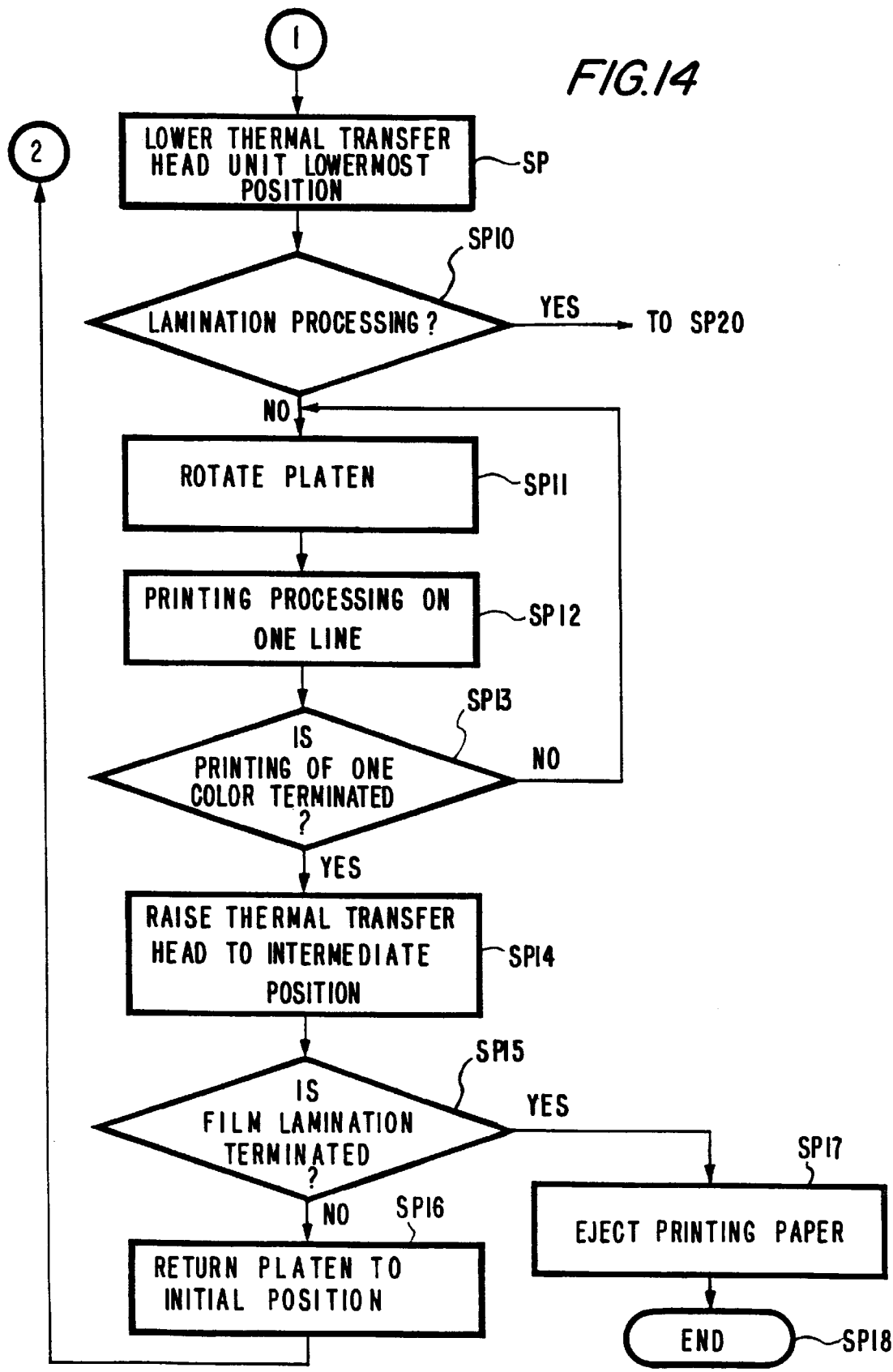

FIG. 14 is a flow chart showing the printing operation according to this embodiment.

Figure 15:
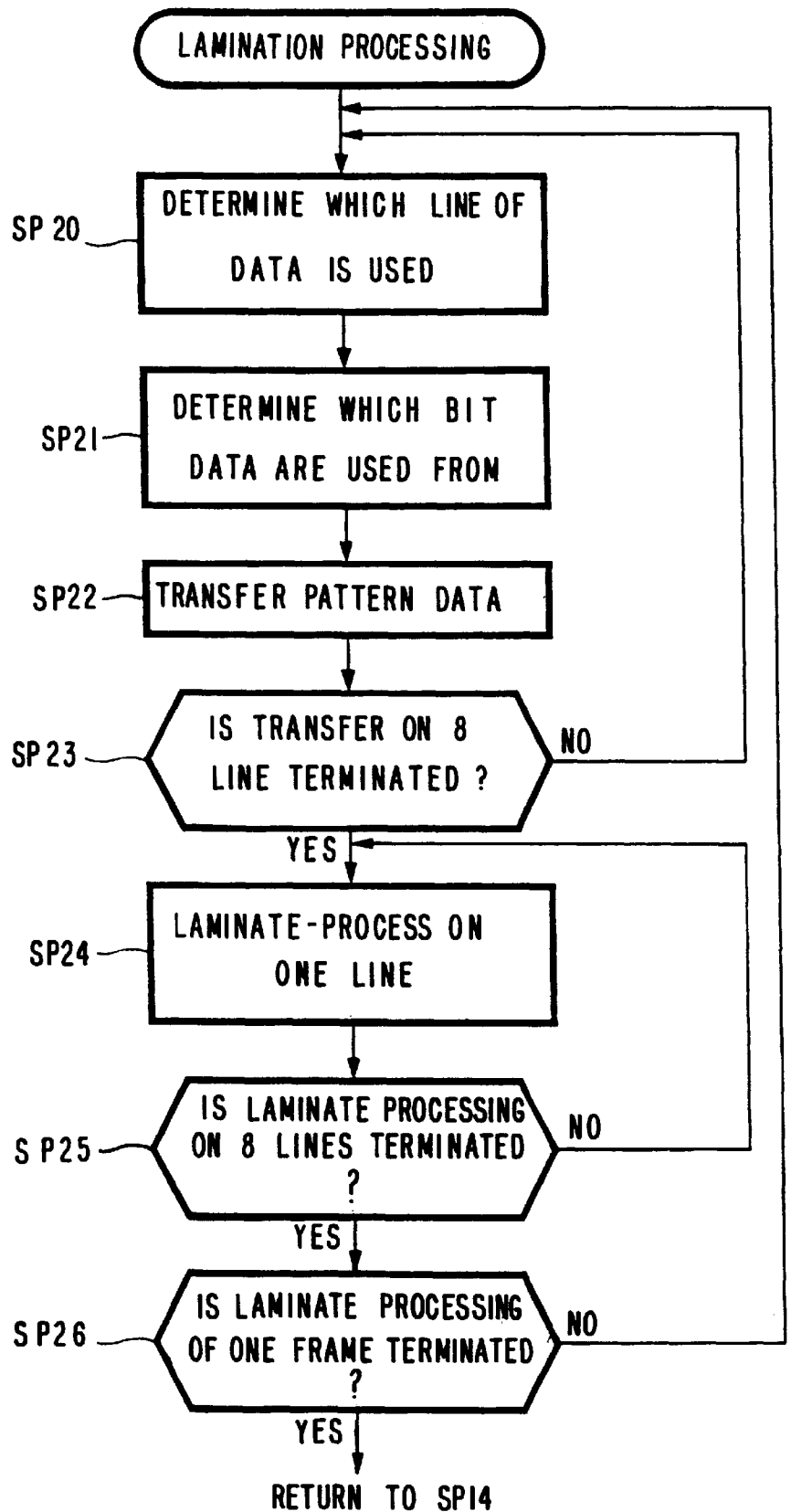

FIG. 15 is a flow chart showing the printing operation according to this embodiment.

BEST MODE FOR CARRYING OUT THE INVENTION

The present invention will next be explained in accordance with the accompanying drawings to describe the present invention in more detail.

1. Printing device

Figure 1:
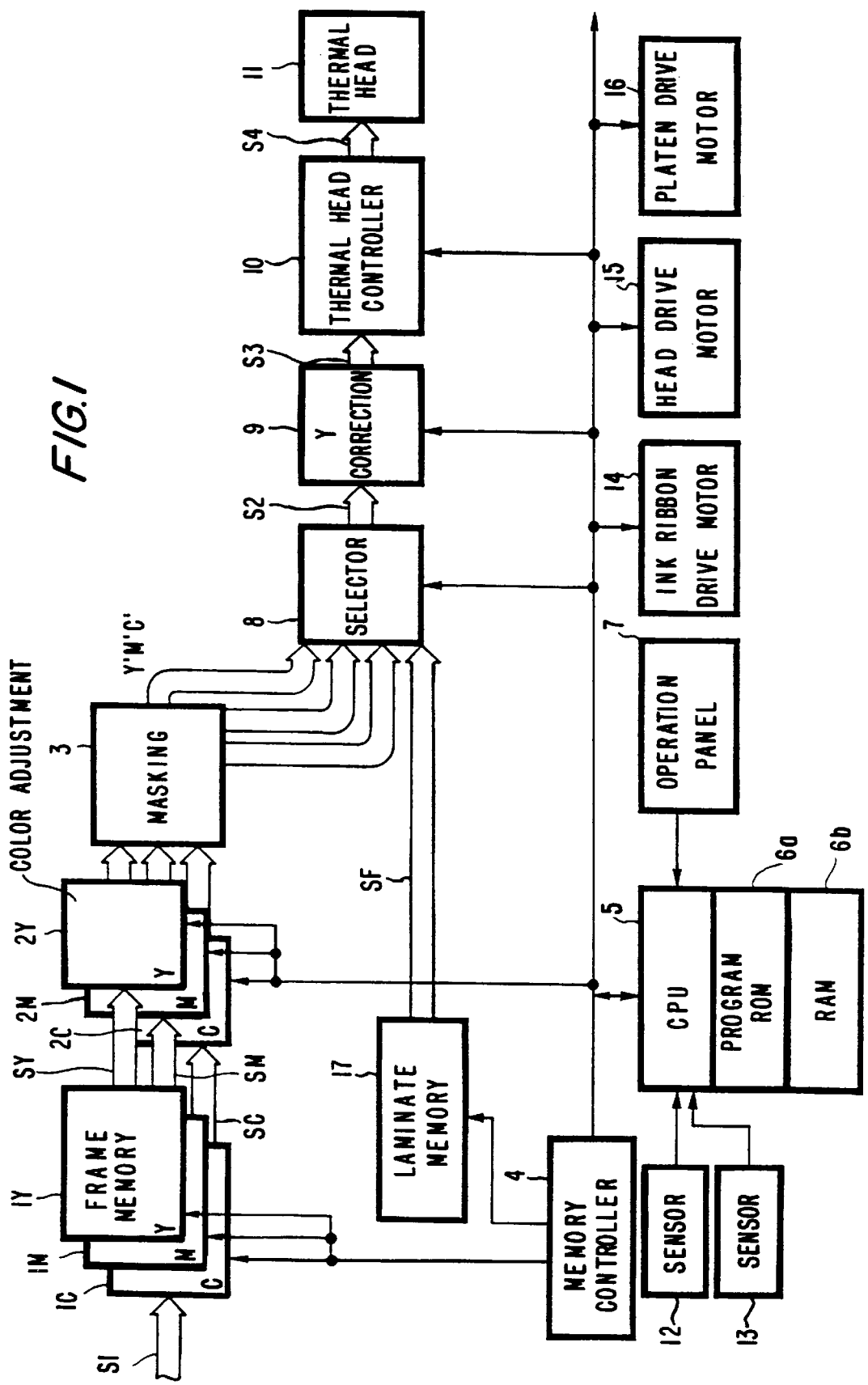
FIG. 1 is a block diagram showing the construction of a printing device according to an embodiment of this invention.

FIG. 1 shows a printing device (color printer) according to an embodiment of this invention. This printer has a frame memory 1, a color adjusting circuit 2, a masking circuit 3, a memory controller 4, a CPU 5, a program ROM 6a, a RAM 6b, an operation panel 7, a selector 8, a γ-correcting circuit 9, a thermal head controller 10, a thermal head 11, an optical sensor 12 and an optical sensor 13. The frame memory stores image data of one screen (frame) with respect to each of yellow, magenta and cyan colors. The color adjusting circuit makes a color adjustment such as a color correction, etc. with respect to each of the yellow, magenta and cyan colors. The masking circuit performs masking of the image data for printing processing. The memory controller controls a writing or reading operation of the image data with respect to the frame memory 1. The CPU controls the operations of respective portions of the printing device. The program ROM stores various kinds of control programs. The RAM stores predetermined pattern data and control data for printing of each of the colors. An operator can set various kinds of operations on the operation panel. The selector selects the image data of each of the yellow, magenta and cyan colors. The γ-correcting circuit carries out a γ-correction. The thermal head controller generates a driving signal. The thermal head performs a thermal printing operation by a thermosensible element. The first optical sensor is used to search for a ribbon head. The second optical sensor is used to detect a printing paper surface.

This printing device also has an ink ribbon drive motor 14 for traveling the ink ribbon in a predetermined direction, a head drive motor 15 for moving the thermal head 11 in an up and down direction, and a platen drive motor 16 for rotating a platen.

This printing device further has a laminate memory 17 in which laminate printing data SF for forming a predetermined concave and convex pattern on a film-shaped sheet F are written. Similar to the frame memory 1, an operation of this laminate memory 17 is also controlled by the memory controller 4. The laminate printing data SF written in the laminate memory 17 are read in a predetermined timing and sent to the selector 8 as they are since the color adjustment and the masking of the data are not required.

If the laminate printing data SF are set to data showing a constant value, a laminate having a uniform thickness can be formed. Further, similar to the color printing data, if the laminate printing data include density data, laminates having different thicknesses can be formed.

The printing device having such a construction is operated as follows.

Image data S1 inputted from an unillustrated host computer are written in the frame memory 1 (1Y, 1M, 1C) having a capacity of one printing screen every color separately each color. This writing operation is controlled by the CPU 5 through the memory controller 4 connected to the CPU 5 through a bus.

The image data Si written in this frame memory 1 are read by the memory controller 4 at a predetermined timing.

A color adjustment is made by the color adjusting circuit 2 (2Y, 2M, 2C) for every color in accordance with a user's taste with respect to color printing data SY, SM and SC respectively corresponding to yellow, magenta and cyan among the read image data. The masking circuit 3 corrects the difference between a dye color and the actual color by mixing one portions of the color image data SY, SM and SC with each other. The masking circuit 3 then supplies corrected image data Y', M' and C' to the selector 8.

The selector 8 sequentially selects the color image data Y', M' and C' respectively corresponding to yellow, magenta and cyan or the laminate printing data SF by control of the CPU 5 in accordance with a predetermined printing operation procedure described later, and sends the selected data to the γ-correcting circuit 9 as printing data S2. The γ-correcting circuit 9 makes a density turning-on time conversion, i.e., the γ-correction by a thermal correction coefficient set on the basis of the control of the CPU 5. As a result, obtained printing data S3 are converted to printing energy S4 by the thermal head controller 10 and are printed by the thermal transfer head 11.

Thus, in this printing device, each of yellow, magenta and cyan images is printed on the basis of the image data S1 supplied by the host computer. Finally, a laminate film is printed on the entire surface of the printing paper having a color image formed thereon on the basis of the laminate printing data SF. This printing operation will be described later in detail.

Figure 2:
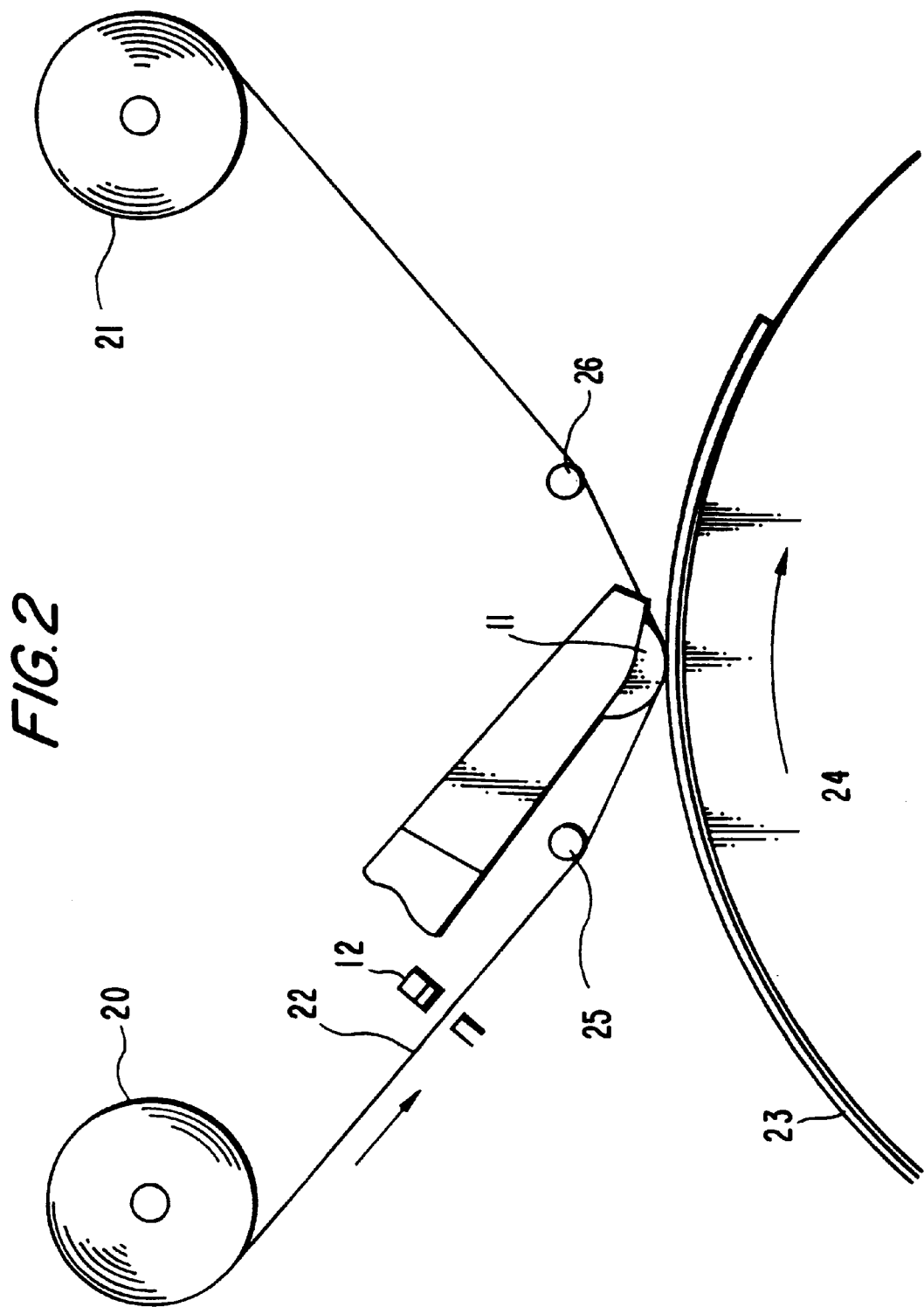

FIG. 2 shows a printing mechanism of this printing device. This printing mechanism has a supplying reel 20 for supplying an ink ribbon, a winding reel 21 for winding the ink ribbon, guide rollers 25, 26 for guiding the ribbon to a printing position, the thermal head 11 for forming the printing position between the guide rollers 25 and 26, a printing paper 23, and a platen 24 for conveying the printing paper 23 to the printing position corresponding to the thermal head 11 by its rotation.

The printing mechanism having such a construction is constructed as follows in detail.

The ink ribbon 22 wound around the supplying reel 20 is wound up around the winding reel 21 rotated by the drive motor 14 in a state in which the ink ribbon is supported by the guide rollers 25, 26. An unillustrated torque limiter is disposed in the supplying reel 20 and applies a back tension to the ribbon 22 with a constant torque. An encoder for winding detection constructed by an unillustrated optical sensor is disposed in the winding reel.

The ribbon 22 is coated with yellow, magenta and cyan color dyes as dyes on one page by their respective predetermined lengths. As described later, the ribbon 22 is coated with a page leading mark and a winding diameter mark at a leading position of each of the color dyes on each page and is also coated with a color discriminating mark for discriminating each of the colors at the leading position of each of the color dyes. Thus, the optical sensor 12 arranged in a traveling path of the ribbon 22 in the printing device detects each of the page leading mark and the color discriminating mark. A leading portion of each dye of the ribbon 22 is positioned on the basis of the detected result.

A head unit having the thermal head 11 is detachably attached to one end of a pressurizing lever rotatably held by a rotating shaft although not illustrated. The other end of the pressurizing lever is swingably attached to a cam plate through a link. Thus, the head unit is raised and lowered through the rotation by the head drive motor 15. The head unit is positioned in an intermediate position in a vertical direction, an initial position raised from this intermediate position and separated from the ribbon, and a lowermost position lowered from the intermediate position and coming in contact with the printing paper 23.

Namely, the head unit is moved to the initial position when the ribbon 22 is mounted. The head unit is moved to the lowermost position when the printing paper is loaded on the platen 24. An elevating state of the head unit is detected by an optical sensor arranged in the vicinity of a notch portion of the cam plate. The thermal head 11 is of an end face type and comes in contact with the printing paper 23 through the ribbon 22 in an entire width direction of the printing paper 23. Thus, when the printing paper 23 is moved in an arrow direction, a desirable image is printed on an entire face of the printing paper 23.

2. Image forming method

A method for forming an image onto the printing paper according to the present invention will next be explained schematically with reference to FIG. 3.

This image forming method will first be explained. As explained in detail with reference to FIGS. 4 and 5, an ink ribbon used in this color printer is the ribbon 22 on which a yellow 50, a magenta 51, a cyan 52 and a laminate film 53 are sequentially arranged repeatedly from the winding side toward the supplying side. The images of respective color components are transferred by sublimation heat to the side of a receiving layer (printing surface) arranged on a surface of the printing paper in the order of the yellow, the magenta and the cyan by the color printer explained with reference to FIG. 1. Thereafter, the laminate film 53 having a predetermined pattern is transferred to the entire surface of the printing paper by sublimation heat.

It should be noted here that the printing device of the present invention does not transfer the laminate film to only a specific portion of an image supplied from a computer, but transfers the laminate film to the entire surface of the printing paper irrespective of a supplied image color. A detailed operation will be explained with reference to the flow charts of FIGS. 13 to 15 described later.

Thus, in this color printer, laminate information is printed in the same printing process as image formation of other color informations. Components of the laminate film 53 are constructed such that this laminate film has a light diffusive property. The laminate film is transferred by sublimation heat in a predetermined printing pattern.

A printing method of this laminate film will next be explained.

The color of a color print is easily faded when no countermeasures are taken. Accordingly, after the color is printed, a color storing property is increased by coating a surface of the color print with a transparent film so as to improve a light resisting property, a skin oil resisting property, etc. For example, as shown in FIG. 4, each color is printed by using the ink ribbon in which the lamination film 53 is arranged after each color ink. Thereafter, the laminate film is laminated in the same process by the thermal transfer head.

This is a technique in which a lamination layer is transferred to an image by uniformly heating resin in a thin film shape coated on the ink ribbon film by the thermal head. The storing property of the image is greatly improved by forming the laminating layer so that the image storing property can be sufficiently obtained.

Further, optical printing can be performed in a silver salt photograph so that an image can be printed on printing papers having various surface properties. For example, it is possible to obtain visual effects of "frosting", etc. such as a "silk texture" formed by a regular pattern and a random concave-convex pattern seen in high grade printing paper. The image can be printed onto such a printing paper with a concave and a convex since the image is formed by non-contact using an optical system in the silver salt photograph.

This is obtained by printing the image onto the printing paper having the concave and the convex on its surface. However, in a printing method using a heat sublimating type ink by the thermal transfer head, a sublimating type printer forms an image while the printing paper and the thermal head come in contact with each other. Therefore, no printing paper having the concave and the convex on its surface can be used as in the silver salt photograph so that no concave and the convex can be formed on the surface of the printing paper. Therefore, the following means is proposed to obtain this "frosting" (hereinafter, noted as "mat processing") effect.

3. Explanation of lamination printing data making scheme

Various kinds of patterns are formed when lamination is performed after an image is printed (normally, an order of yellow→magenta→cyan). Thus, the surface mat processing is performed such that various surface properties are obtained.

3-1. Silk pattern

FIG. 6 shows a silk pattern in which concaves and convexes formed on the laminate film transferred to the printing paper are regularly arranged in a silk texture shape upward, downward, leftward and rightward at a constant interval.

Figure 7A:
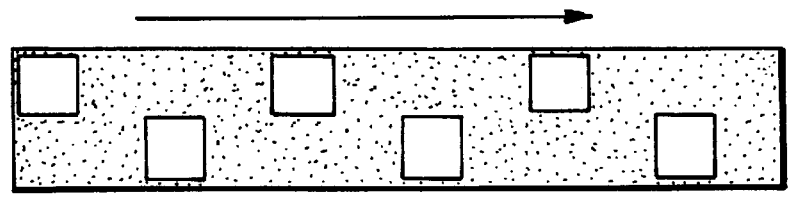
Figure 7B:
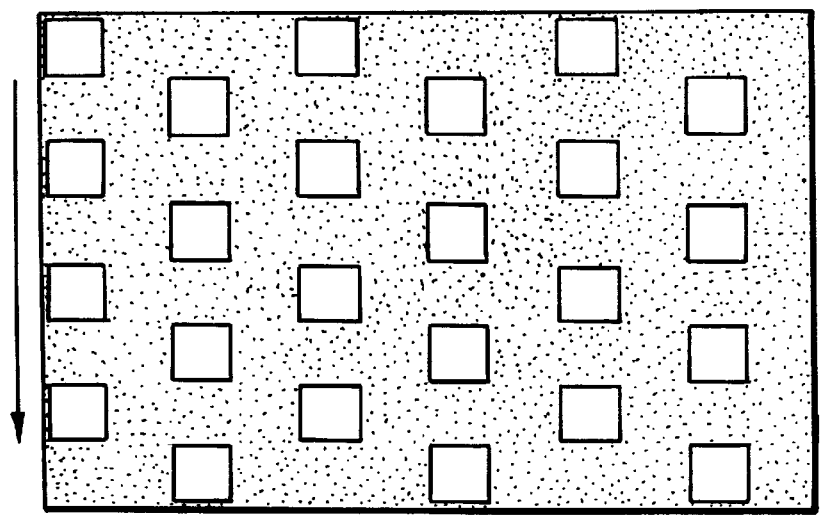

This silk pattern is formed to obtain the mat processing effect by forming a silk concave-convex pattern as shown in FIG. 6 when the lamination film 53 of the ink ribbon 22 is laminated on a color image by the thermal transfer head. In this figure, white and black correspond to concaves and convexes. FIG. 7 shows one example of a generating method of this silk concave-convex pattern. In FIG. 7(A), constructional elements of the silk concave-convex pattern are formed by a two line amount in the main scanning direction of the arrow and only the pattern shown here is stored in the laminate memory 17 of FIG. 1. As shown in FIG. 7(B), the concave-convex pattern of FIG. 7(A) is continuously generated on an entire image surface on the basis of the stored pattern in the secondary scanning direction of the arrow.

For example, the constructional elements shown in FIG. 7(A) have a pattern showing concaves and convexes at every 2560 pixels in the main scanning direction of the arrow. This pattern is constructed by two lines of first and second lines. In this figure, white and black correspond to concaves and convexes. The first line and the second line are constructed by the same pattern, but their phases are shifted by 180 degrees from each other. This pattern is repeated in the secondary scanning direction so that a silk texture regular concave-convex pattern is formed on the entire image surface.

As mentioned above, the mat processing effect can be obtained by forming the silk texture concaves and convexes on the lamination film.

When a white dot is set to correspond to "0" and a black dot is set to correspond to "1" in FIG. 7A, one byte data of "0, 1, 1, 1, 0, 1, 1, 1" are repeated on the first line, and one byte data of "1, 1, 0, 1, 1, 1, 0, 1" are repeated on the second line. Namely, DDh is repeated on an odd line and BBh is repeated on an even line. As will be described later on, a head application voltage is set to be low with respect to the white dot and the laminate layer is thinly formed, while the head application voltage is set to be high with respect to the black dot and the laminate layer is thickly formed.

A minimum unit of the silk pattern shown in FIG. 7A may be formed on every other line without continuously forming the minimum unit of the silk pattern shown in FIG. 7A, and a flat pattern (black or white) may be formed therebetween and this pattern may be continuously formed.

When lamination printing data are generated within the printer and all the data are stored in the laminate memory 17, a data amount becomes very large. Accordingly, the operation of the printer is controlled such that the pattern is generated from various kinds of algorithms described later in accordance with necessity.

A generating algorithm of the silk pattern will next be explained.

The silk pattern is a periodic continuous pattern. Therefore, desirable results are obtained (FIG. 7B) if a writing operation of the memory is performed by only one line amount of the minimum unit (FIG. 7A) and memory addresses in the secondary scanning direction are looped only in portions of the minimum unit at a printing time.

Figure 8A:
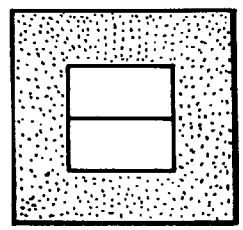
Figure 8B:
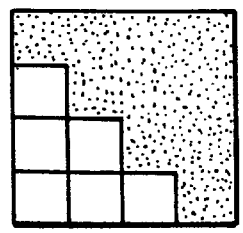

As shown in FIGS. 8A and 8B, the silk pattern may be formed by setting 4×4 dots to the minimum unit and continuously repeating the dots. In the case of FIG. 8A, the silk pattern is symmetrical with respect to a transversal or longitudinal central line. Accordingly, for example, it is possible to easily read data from the RAM 6b and form the continuous silk pattern at high speed by specularly reading a symmetrical portion transversally or longitudinally. In the case of FIG. 8B, the silk pattern is symmetrical with respect to a diagonal line. Accordingly, for example, it is possible to easily read data from the RAM 6b and form the continuous silk pattern at high speed by inverting all symmetrical portions and reading the symmetrical portions.

3-2. Random pattern

A pattern as shown in FIG. 9 is generated on the computer or within the a printer, and a lamination layer is printed so that an effect corresponding to high quality printing paper having a rough feeling is obtained.

FIG. 9 shows one example of a random concave-convex pattern formed on the lamination film 53, and white and black correspond to concaves and convexes. This provides preferable visual effects in comparison with the silk texture pattern shown in FIG. 6.

One example of a generating method of the above random pattern will next be explained with reference to FIGS. 10 to 12. In this method, the random pattern is generated on the basis of a constant algorithm. Accordingly, it is not necessary to store the random pattern on an entire image face so that a using amount of the memory can be reduced.

A concave-convex amount is first determined at a predetermined ratio. Next, 8 lines each constructed by 2560 pixels having concaves and convexes generated on the basis of this ratio and arranged at random are formed and are stored in the RAM 6b. These 2560 pixels are divided into data every 8 bits and each of these divided data is displayed at two digits of hexadecimal notation. For example, first 8 bits of compressed data 80 on a first line in FIG. 10 are represented as 6Bh when white is set to "0" and black is set to "1" and a right-hand end is set to MSB and a left-hand end is set to LSB.

Similarly, the next 8 bits are represented as 29h, and the further next 8 bits are represented as 64h, and the even further next 8 bits are represented as CDh, —so that all the bits are represented in two digits of the hexadecimal notation.

Next, the generation of the random pattern on the entire image face from the above 8 lines will next be explained.

Here, the random pattern are formed by nonperiodic data so that no random pattern can be made only by repeating the minimum unit. Therefore, the random pattern must be generated from limited data.

An algorithm 1 for making random pattern data of the minimum unit in the generation of the random pattern will next be explained.

First, random pattern data which will become the minimum unit are made as shown in FIG. 10. The random pattern data may be made in any method. At this time, a ratio of white to black is determined in advance, and the random pattern data are made such that the data are arranged at random in this ratio.

When the above random pattern data are developed in the laminate memory 17, it is not efficient to record all these data to the RAM 6b. Accordingly, the random pattern data are encoded such that 8 dots of white or black data are set to one byte. Thus, as shown in FIG. 11B, data 90 are compressed to ⅛. Accordingly, for example, data of 8 lines×2560 dots become data of 2.5 k bytes so that a data amount storable into the RAM 6b is obtained.

An algorithm for making the random pattern data of 8 line amount in the generation of the random pattern will next be explained.

Next, the printing data of a desirable size are made from data of the minimum unit in the laminate memory 17. The printing data are made by the next algorithm.

As already described, the pattern data of the RAM 6b shown in FIG. 11B have a random property as image data. Therefore, the random pattern data can be generated in transversal and longitudinal directions of the printing data by using the random pattern data in development upon printing.

A concrete example of the printing data is shown in FIG. 12. In this example, addressing for determining a starting point of the printing data is made from 1 byte and 2 bytes of data of the RAM 6b in a head vertical direction (secondary scanning direction) and a head direction (main scanning direction). The remainder of 8 is used in the secondary scanning direction since only image data on 8 lines exist in the laminate memory 17. Accordingly, there is no special meaning with respect to this number 8 itself. Similarly, the remainder of 2560 is used in the main scanning direction since the number of elements of a head is assumed to be 2560. Accordingly, there is no special meaning with respect to this number 2560 itself. A data size, etc. may be suitably changed in accordance with a printing size of the printer, etc.

First, an algorithm for making data on a first line of the lamination printing data will next be explained with reference to FIG. 12.

The data of a first 1 byte in the pattern data shown in FIG. 12 are set to "6Bh". Accordingly, the data "6Bh" is divided by 8 so that the remainder is calculated. The remainder in this divisional calculation is "3". Accordingly, it is determined that data on a third line of the pattern data stored in the RAM 6b are used as line data 100 on the first line of the lamination printing data. Next, data generated from the data "6Bh" of the first 1 byte and data "29h" of the next 1 byte are set to "6B29h". Accordingly, the data "6B29h" is divided by 2560 so that the remainder is calculated. The remainder in this divisional calculation is "1833". Therefore, it is determined that the data of a 1833rd bit on the third line of the pattern data stored in the RAM 6b are used as data 101 of a first dot on the first line of the lamination printing data.

Namely, the data of 2560 bits are used as data on the first line of the lamination printing data from the data of the 1833rd bit on the third line of the pattern data stored in the RAM 6b by making a calculation using the first 1 byte "6Bh" and the next 1 byte "29h".

Next, an algorithm for making data on a second line of the lamination printing data will next be explained.

The data of the first 1 byte in the pattern data shown in FIG. 12 are set to "29h". Accordingly, the data "29h" is divided by 8 so that the remainder is calculated. The remainder in this divisional calculation is "1". Therefore, it is determined that data on the first line of the pattern data stored in the RAM 6b are used as line data 102 on the second line of the lamination printing data. Next, data generated from the data "29h" of the first 1 byte and data "64h" of the next 1 byte are set to "2964h" so that the data "2964h" is divided by 2560 and the remainder is calculated. The remainder in this divisional calculation is "356". Accordingly, it is determined that the data of a 356th bit on the first line of the pattern data stored in the RAM 6b are used as data 103 of a first dot on the second line of the lamination printing data.

Namely, the data of 2560 bits are used as data on the second line of the lamination printing data from the data of the 356th bit on the first line of the pattern data stored in the RAM 6b by making a calculation using the first 1 byte "29h" and the next 1 byte "64h".

Next, an algorithm for making data on a third line of the lamination printing data will be explained.

Since data of the first 1 byte in the pattern data shown in FIG. 12 are set to "64h", the data "64h" is divided by 8 and the remainder is calculated. The remainder in this divisional calculation is "4". Accordingly, it is determined that data on a fourth line of the pattern data stored in the RAM 6b are used as line data 104 on the first line of the lamination printing data. Next, data generated from the data "64h" of the first 1 byte and data "CDh" of the next 1 byte are set to "64CDh". Accordingly, this data "64CDh" is divided by 2560 and the remainder is calculated. The remainder in this divisional calculation is "205". Therefore, it is determined that the data of a 205th bit on the fourth line of the pattern data stored in the RAM 6b are used as data 105 of a first dot on the third line of the lamination printing data.

Namely, the data of 2560 bits are used as data on the third line of the lamination printing data from the data of the 205th bit on the fourth line of the pattern data stored in the RAM 6b by making a calculation using the first 1 byte "64h" and the next 1 byte "CDh".

Thus, the random pattern on an entire image face is determined by sequentially determining concave-convex patterns on printing lines.

The above data are divided by 8 since only the random pattern on 8 lines exist. Further, the above data are divided by 2560 since the number of pixels in the main scanning direction is 2560. Accordingly, it is natural that a size of the random pattern may be suitably determined by the construction of a printed image.

The generator of this random pattern is not limited to the printer. For example, the random pattern may be generated by a personal computer, etc. from an external device of the printer and may be supplied to the printer.

Here, a head application voltage in transfer of the above-mentioned lamination layer onto printing paper will be explained.

A necessary and sufficient application voltage is applied to a black portion within the silk pattern shown in FIG. 6 or the random pattern shown in FIG. 9 so that a lamination layer thicker than a portion except for the black is formed. In contrast to this, the application voltage is applied to a portion of white data in the same figures such that the thickness of this white data portion is slightly thinner than the black portion. At this time, the application voltage is set such that no storing property of an image of this white portion is injured. This application voltage is a voltage for printing a laminate film.

Thus, mat processing is performed. Accordingly, the mat processing impossible so far except for a silver salt photograph can be also realized in a sublimating type printer, etc.

Further, the mat processing can be realized at very low cost by using the algorithm of random generation since no memory is unnecessarily added.

Further, since the ratio of white and black is determined in advance, random data made by this technique are also made in the same ratio and the ratio of concaves and convexes in the mat processing can be also freely adjusted.

Further, since the algorithm itself is very simple, it is possible to sufficiently cope with an environment such as a microcomputer and an assembler having no power, etc.

Further, since the algorithm itself is very simple, the random pattern can be also generated for a sufficiently short period of time in data generation in real time as in a printing process.

4. Operating explanation

A printing operation of the printing device in the embodiment mode of the present invention thus constructed will next be explained with reference to FIGS. 13 to 15. In FIG. 13, one kind of pattern data are selected from four kinds of pattern data constructed by flat pattern data stored in the RAM 6b, data of a silk texture (silk) pattern, pattern data obtained by repeating the flat and silk patterns at every one line, and random pattern data in accordance with the selection of an operator on the operation panel 7 in advance before a printing operation is started in a step SP1. In a step SP2, the printing paper 23 is wound around the platen 24. Here, a silver edge is formed at one end portion on each of left-hand and right-hand sides on a front end side of the printing paper in its conveying direction and another end portion on each of left-hand and right-hand sides on a rear end side of the printing paper so as to discriminate a surface of the printing paper. Further, the optical sensor 13 having two elements is respectively arranged at positions corresponding to left-hand and right-hand end portions on a conveying path of the printing paper. The surface of the printing paper is discriminated when the two optical sensors 13 detect the silver edges at the one end portions on the left-hand and right-hand sides on this front end side and then detect the silver edges at the other end portions on the left-hand and right-hand sides on the rear end side. Here, the optical sensors 13 are of a transmission type and are set such that the surface of the printing paper is discriminated by detecting the silver edges through which no light is transmitted. This operation is performed by conveying the printing paper by means of conveying rollers from, e.g., an unillustrated paper feed mechanism arranged on a left-hand downward side of the platen 24 in FIG. 2 to a position of the platen 24.

Next, the platen 24 is positioned to an initial position in the step SP2. This positioning operation is performed by moving a print starting position of the printing paper wound around the platen 24 until a position corresponding to a downward position of the thermal head 11 by rotating the platen 24 in an arrow direction in FIG. 2.

Subsequently, the thermal head 11 is lowered to the intermediate position in a step SP3. This lowering operation is performed by lowering the thermal head 11 by the head drive motor 15 from the raising position to the intermediate position, and detecting the intermediate position by the encoder arranged in the head drive motor 15.

Next, the CPU 5 determines a printed color in a step SP4. In this color printer, a first printed color is yellow among yellow, magenta, cyan and a laminate film. Accordingly, in this step, the CPU 5 first determines that the first printed color is yellow. The CPU 5 controls an operation of the selector 8 by this selecting operation such that yellow image data stored in the frame memory 1Y are supplied to the thermal head controller 10.

Next, in a step SP5, the CPU 5 controls the operation of a drive motor for driving the ink ribbon on the basis of an output of the optical sensor 12 such that the head of a yellow region of the ink ribbon is searched for.

Concretely, as shown by a ribbon detecting operation in FIG. 5, the optical sensor 12 arranged on the ribbon conveying path at a position corresponding to the thermal head 11 above the platen 24 detects marks 60 and 61 formed at leading positions of yellow 50, a mark 62 formed at a leading position of magenta 51, a mark 63 formed at a leading position of cyan 52, and a mark 64 formed at a leading position of the laminate film 53, respectively. Here, the optical sensor 12 is of a transmission type and it is known that the next color is started by detecting each of the marks 60 to 64 through which no light is transmitted. In particular, since the yellow 50 is located at a head of the ribbon for starting a printing operation and it is necessary to repeatedly detect the leading position at every printing operation, the two marks 60 and 61 are formed to be discriminated from the other. The mark 64 at a starting position of the laminate film and a blank 65 showing a terminating position of the laminate film 53 are formed to print the laminate film 53 on an entire surface of the printing paper so that the start and the termination of the laminate film can be detected. An encoder arranged in the ribbon drive motor detects that the ribbon drive motor is rotated by a predetermined rotating number after the optical sensor 12 detects each of the marks showing the leading positions of the respective colors. Each of printing ranges of the respective colors is discriminated by this detection of the encoder. This head searching operation of the ink ribbon is carried out to perform the printing operation on one page of each of the colors.

Next, in a step SP6, the CPU 5 judges a using extent of the ink ribbon by the number of printing processings stored in the RAM 6b and then judges a winding diameter of the ink ribbon in accordance with a using state of this ink ribbon.

Next, in a step SP7, the CPU 5 sets a driving condition of the ribbon drive motor 14.

Next, in a step SP8, the CPU 5 sets a head voltage supplied to a thermosensible element of the thermal head 11. Concretely, the CPU 5 refers to the data of a head voltage table stored in the RAM 6b and controls an operation of the thermal head controller 10 so as to set a head voltage according to the printed color determined in the step SP4.

Next, in a step SP9 shown in FIG. 14, the thermal head 11 is lowered until the lowermost position by the head drive motor 15. This lowering operation is performed by lowering the thermal head 11 by the head drive motor 15 from the intermediate position to the lowermost position, and detecting the lowermost position by an encoder arranged in the head drive motor 15. When the thermal head 11 is lowered until the lowermost position, the ribbon begins to be wound by the ribbon drive motor 14. In a step SP10, since no lamination processing is performed, the platen is rotated by one line amount by the platen drive motor 16 in a step SP11.

Next, in a step SP12, the CPU 5 supplies printing data of one line amount from the frame memory 1Y to the thermal head controller 10. The thermal head 11 forms an image of the yellow component of one line amount on the printing paper in accordance with the printing data.

In a step SP13, the CPU 5 judges whether or not the printing processing of one frame amount is terminated. If the printing processing of one frame amount is terminated, it proceeds to the next step SP14. In contrast to this, if no printing processing of one frame amount is terminated in this step, it is returned to the step SP11 and the step SP12 and the step SP13 are repeated until the printing processing of one frame amount is terminated. The CPU 5 judges whether or not the printing processing in the step SP12 is terminated on all lines (965 lines in this printing device) of one frame. Thus, the CPU can judge by this judgment whether the printing processing of one frame amount is terminated or not.

Next, in a step SP14, the CPU 5 controls an operation of the head drive motor such that the thermal head is raised to the intermediate position.

Next, in a step SP15, the CPU judges whether the printing processings of yellow, magenta, cyan and the laminate film are terminated or not. When no printing processings are terminated, the platen is returned to its initial position in a step SP16 and it is returned to the step SP4. In contrast to this, when the CPU judges in the step SP15 that the printing processing of the laminate film is terminated, the printing paper is discharged in a step SP17 and the printing operation is terminated.

In this case, it is returned to the step SP4 since only the yellow printing processing is terminated.

Next, the CPU 5 designates magenta as a printed color next to yellow in the step SP4 in a second loop.

First, in a step SP5, the CPU 5 controls an operation of the ribbon drive motor 14 for operating the ink ribbon on the basis of an output of the optical sensor 12 so as to search the head of a magenta region of the ink ribbon.

Next, in a step SP6, the CPU 5 judges a using extent of the ink ribbon by the number of printing processings stored in the RAM 6b and then judges a winding diameter of the ink ribbon in accordance with a using state of this ink ribbon.

In a step SP7, the CPU 5 sets a driving condition of the ribbon drive motor 14. Next, in a step SP8, the CPU 5 sets a head voltage supplied to the thermosensible element of the thermal head 11.

In a step SP9, the thermal head 11 is lowered by the head drive motor 15 until the lowermost position. Since no lamination processing is performed in a step SP10, the platen is rotated by one line amount by means of the platen drive motor 16 in a step SP11. Next, in a step SP12, the CPU 5 supplies printing data of one line amount from the frame memory 1M to the thermal head controller 10. In a step SP13, the CPU 5 judges whether the printing processing of one frame amount is terminated or not. If the printing processing of one frame amount is terminated, it proceeds to the next step SP14. In the step SP14, the CPU 5 controls the operation of the head drive motor 15 such that the thermal head 11 is raised to the intermediate position. Next, in a step SP15, the CPU judges whether the printing processings of yellow, magenta, cyan and the laminate film are terminated or not. When no printing processings are terminated, the platen is returned to its initial position in a step SP16 and it is returned to the step SP4.

Next, the CPU designates cyan as a printed color next to magenta in the step SP4 within a third loop.

First, in a step SP5, the CPU 5 controls the operation of the ribbon drive motor 14 for operating the ink ribbon on the basis of an output of the optical sensor 12 so as to search the head of a cyan region of the ink ribbon.

Next, in a step SP6, the CPU 5 judges a using extent of the ink ribbon by the number of printing processings stored in the RAM 6b and then judges a winding diameter of the ink ribbon according to a using state of this ink ribbon.

Next, in a step SP7, the CPU 5 sets a driving condition of the ribbon drive motor 14. In a step SP8, the CPU 5 sets a head voltage supplied to the thermosensible element of the thermal head 11. In a step SP9, the thermal head 11 is lowered by the head drive motor 15 until the lowermost position. Since no lamination processing is performed in a step SP10, the platen is rotated by one line amount by the platen drive motor 16 in a step SP11. Next, in a step SP12, the CPU 5 supplies printing data of one line amount from the frame memory 1C to the thermal head controller 10. In a step SP13, the CPU 5 judges whether the printing processing of one frame amount is terminated or not. If the printing processing of one frame amount is terminated, it proceeds to the next step SP14. Next, in the step SP14, the CPU 5 controls the operation of the head drive motor 15 such that the thermal head 11 is raised to the intermediate position. Next, in a step SP15, the CPU judges whether the printing processings of yellow, magenta, cyan and the laminate film are terminated or not. When no printing processings are terminated, the platen is returned to its initial position in a step SP16 and it is returned to the step SP4.

Next, the CPU 5 designates the laminate film as a printed color next to cyan in the step SP4 within a fourth loop.

First, in a step SP5, the CPU 5 controls the operation of the ribbon drive motor 14 for operating the ink ribbon on the basis of an output of the optical sensor 12 so as to search the head of a laminate film region of the ink ribbon.

Next, in a step SP6, the CPU 5 judges a using extent of the ink ribbon by the number of printing processings stored in the RAM 6b and then judges a winding diameter of the ink ribbon according to a using state of this ink ribbon.

Next, in a step SP7, the CPU 5 sets a driving condition of the ribbon drive motor 14.

Next, in a step SP8, the CPU 5 sets a head voltage supplied to the thermosensible element of the thermal head 11.

Concretely, the CPU 5 controls an operation of the thermal head controller 10 so as to preset the head voltage of the thermal head on the basis of a default value of the head voltage stored in the RAM 6b and an offset value of the head voltage according to printing of the laminating film.

In a step SP9, the thermal head 11 is lowered by the head drive motor 15 until the lowermost position. Next, in a step SP10, the CPU 5 judges whether it is lamination processing or not. Since this fourth loop shows the lamination processing, the CPU 5 judges that it proceeds to a step SP20 shown in FIG. 15.

In the step SP20, the CPU 5 determines which line of pattern data stored in the RAM 6b is used as data on a first line of lamination printing data on the basis of the data of a first 1 byte in the pattern data selected by an operator in advance among the four pattern data stored in the RAM 6b.

In the example of the silk pattern shown in FIG. 11A, the data of the first 1 byte in the pattern data stored in the RAM 6b are set to "DDh". Accordingly, the CPU 5 determines the data "DDh" as data on the first line of the lamination printing data.

In a step SP21, the CPU 5 determines which bit the pattern data are used from as data on the first line of the lamination printing data on the line determined in the step SP20 in the pattern data stored in the RAM 6b on the basis of the data of the first 1 byte in the pattern data stored in the RAM 6b. In the example of the silk pattern data shown in FIG. 11A, the data of the first 1 byte are "DDh". Accordingly, the CPU 5 determines that the data of 2560 bits are used from data of the first bit on the first line of the pattern data stored in the RAM 6b as data on the first line of the lamination printing data.

In a step SP22, the CPU 5 controls an operation of the memory controller 4 such that the data of 2560 bits are developed from the data of the first bit on the first line of the pattern data stored in the RAM 6b to predetermined addresses of the laminate memory 17 as data on the first line of the lamination printing data.

In a step SP23, the CPU 5 judges whether or not the lamination printing data of 8 line amount are stored in the laminate memory 17. Namely, the CPU 5 judges that it proceeds to a step SP24 if the lamination printing data of 8 line amount are already generated from the pattern data stored in the RAM 6b. In contrast to this, if no lamination printing data of 8 line amount are generated, the loop of steps SP20, SP21, SP22 and SP23 is repeated by repeatedly using the data of "DDh" on the odd lines and "BBh" on the even lines until the lamination printing data of 8 line amount are generated.

In the step SP24, the CPU 5 controls an operation of the memory controller 17 such that the lamination printing data on the first line stored in the laminate memory 17 are read therefrom and are supplied to the selector 8. Further, the CPU 5 controls operations of the selector 8, the gamma correcting circuit 9, the thermal head controller 10 and the platen drive motor 16 so as to perform the printing processing of one line amount on the basis of the data of one line amount.

In a step SP25, the CPU 5 judges whether or not the laminate processing of 8 line amount is terminated by the processing in the step SP24. Namely, the CPU 5 judges whether the printing processing with respect to the lamination printing data of 8 line amount transferred to the laminate memory 17 is terminated or not. If the laminate processing of 8 line amount is already terminated, the CPU judges that it proceeds to a step SP26. In contrast to this, if no laminate processing of 8 line amount is yet terminated, the processings in the steps SP24 and SP25 are repeated until the laminate processing of 8 line amount is terminated.

In the step SP26, the CPU 5 judges whether the laminate processing of one screen amount is terminated or not.

Next, a printing case of the random pattern data shown in FIG. 11B onto a film will be explained. In the step SP20, the data of a first 1 byte in the pattern data stored in the RAM 6b are "6Bh". Accordingly, the CPU 5 divides the data "6Bh" by 8 and calculates the remainder. Since this calculated result is "3", the CPU 5 subsequently determines that data on a third line in the pattern data stored in the RAM 6b are used as data on the first line in the lamination printing data.

In the step SP21, the CPU 5 determines which bit the pattern data are used from on the line determined in the step SP20 in the pattern data stored in the RAM 6b as data on the first line in the lamination printing data on the basis of the data of the first 1 byte in the pattern data stored in the RAM 6b and data of the next 1 byte. In the example of the random pattern data shown in FIG. 11B, data generated from the data "6Bh" of the first 1 byte and the data "29h" of the next 1 byte are "6B29h". Accordingly, the CPU 5 first divides the data "6B29h" by 2560 and calculates the remainder. Since this calculating result is "1833", the CPU 5 subsequently determines that the data of 2560 bits are used from the data of a 1833rd bit on the third line of the pattern data stored in the RAM 6b as data on the first line of the lamination printing data.

In the step SP22, the CPU 5 controls the operation of the memory controller 4 such that the data of 2560 bits are developed from the data of the 1833rd bit on the third line in the pattern data stored in the RAM 6b to predetermined addresses of the laminate memory 17 as data on the first line of the lamination printing data.

In the step SP23, the CPU 5 judges whether or not the lamination printing data of 8 line amount are stored in the laminate memory 17. Namely, if the lamination printing data of 8 line amount are already generated from the pattern data stored in the RAM 6b, the CPU judges that it proceeds to the step SP24. In contrast to this, if no lamination printing data of 8 line amount are yet generated, the loop of steps SP20, SP21, SP22 and SP23 is repeated until the lamination printing data on 8 lines are generated.

In the step SP24, the CPU 5 controls the operation of the memory controller 17 such that the lamination printing data on the first line stored in the laminate memory 17 are read therefrom and are supplied to the selector 8. Further, the CPU 5 controls the operations of the selector 8, the gamma correcting circuit 9, the thermal head controller 10 and the platen drive motor 16 so as to perform the printing processing of one line amount on the basis of the data of one line amount.

In the step SP25, the CPU 5 judges whether or not the laminate processing of 8 line amount is terminated by the processing in the step SP24. Namely, the CPU 5 judges whether the printing processing with respect to the lamination printing data of 8 line amount transferred to the laminate memory 17 is terminated or not. If the laminate processing of 8 line amount is already terminated, the CPU judges that it proceeds to the step SP26. In contrast to this, if no laminate processing of 8 line amount is yet terminated, the processings in the steps SP24 and SP25 are repeated until the laminate processing of 8 line amount is terminated.

In the step SP26, the CPU 5 judges whether the laminate processing of one screen amount is terminated or not.

Next, in the step SP14, the CPU controls the operation of the head drive motor such that the thermal head is raised to the intermediate position.

Next, in the step SP15, it is judged whether the printing processings of yellow, magenta, cyan and the laminate film are terminated or not. Since these printing processings are terminated, the printing paper is discharged in the step SP17 and the printing operation is terminated.

Thus, yellow, magenta and cyan color images are printed on a surface of the printing paper by printing data of the respective colors. The laminate of a predetermined pattern is printed on entire surfaces of these color images. Thus, it is possible to obtain a color print image having no light reflection seen from its surface.

As described above, in accordance with the printing device according to this embodiment, it is possible to print the laminate films of four kinds of concave and convex patterns constructed by a flat laminate film, the laminate film of a silk texture (silk) pattern, a laminate film repeating the flat and silk texture patterns at every one line, and the laminate film of a random pattern in accordance with the selection of an operator on the operation panel 7.

In accordance with the present invention, it is possible to realize mat processing impossible except for a conventional silver salt photograph by a sublimating type printer, etc. The mat processing can be also performed for a short period of time by using a means for generating silk texture or random data for forming concaves and convexes at every pixel at high speed. Further, it is not necessary to use a memory for storing the silk texture or random data corresponding to one image.

Further, a generating ratio of the concaves and convexes can be easily set by arranging a means for setting the generating ratio of the concaves and convexes in the generating means of the random data. Accordingly, a mat processing pattern having large visual effects can be easily formed.

5. Another embodiment mode

The lamination pattern may be also generated by an external computer or the laminate memory 17 within the printer.

In formation of the lamination pattern using the external computer, a predetermined pattern (mentioned above) is transferred from the computer to the printer and is printed as in image printing.

In the formation of the lamination pattern in the laminate memory 17 within the printer, the lamination pattern is generated by using an algorithm from limited unit pattern information stored in the laminate memory 17 so as to generate the pattern within the printer without forming all patterns in the laminate memory 17 of the printer.

Thus, the above-mentioned pattern is externally generated in advance and data thereof are transferred as image data from a personal computer, etc. and are printed as a lamination layer so that the lamination layer having the pattern can be formed. Industrial Applicability It is possible to obtain a color image having no light reflection and having a high quality by printing an image to printing paper and printing the laminate film of a predetermined pattern by the printing device of this invention.

We claim:

1. A printing device for performing a predetermined printing on a print surface of a predetermined printing medium with a color ink arranged on an ink ribbon and a sheet arranged adjacent to said color ink on said ink ribbon in order to be transferred onto said print surface by a thermal transfer head, said printing device comprising:

a memory for storing minimum unit pattern data representing a partial pattern of a pattern of light and dark shapes to be transferred to said sheet on an entire print surface thereof; and printing means for reading said minimum unit pattern data stored in said memory and, using a predetermined algorithm, generating an entire pattern on said print surface based on said minimum unit pattern data;

wherein said predetermined algorithm generates said entire pattern by looping memory addresses of said minimum unit pattern data when generating a flat pattern, a silk pattern, or an alternating flat/silk pattern, and wherein said predetermined algorithm generates said entire pattern by sequentially determining a random pattern of light and dark shapes on each printing line based on a predetermined ratio of light and dark shapes when generating a random entire pattern.

2. A printing device as claimed in claim 1, wherein said printing means includes means for transferring said pattern as a silk texture formed of a periodic and continuous pattern of light and dark shapes.

3. A printing device as claimed in claim 1, wherein said printing means includes means for forming a random pattern of light and dark shapes by changing a reading line at every line based on said minimum unit pattern data stored in said memory.

4. A printing device as claimed in claim 1, wherein said printing means includes means for changing a reading starting dot at every line based on said minimum unit pattern data stored in said memory.

5. A printing device as claimed in claim 1, wherein said memory includes means for storing a plurality of types of patterns of light and dark shapes, and one of said plurality of types of patterns of light and dark shapes is read by selection of an operator.

6. A printing method for performing a predetermined printing on a print surface of a predetermined printing medium with a color ink arranged on an ink ribbon and a sheet arranged adjacent to said color ink on said ink ribbon in order to be transferred onto said print surface by a thermal transfer head, said printing method comprising the steps of:

storing minimum unit pattern data representing a partial pattern of a pattern of light and dark shapes to be transferred onto said sheet on an entire print surface thereof;

reading said stored minimum unit pattern data; and using a predetermined algorithm, generating an entire pattern on said print surface based on said minimum unit pattern data;

wherein said predetermined algorithm generates said entire pattern by looping memory addresses of said minimum unit pattern data when generating a flat pattern, a silk pattern, or an alternating flat/silk pattern, and wherein said predetermined algorithm generates said entire pattern by sequentially determining a random pattern of light and dark shapes on each printing line based on a predetermined ratio of light and dark shapes when generating a random entire pattern.

7. A printing method as claimed in claim 6, wherein said pattern has a silk texture formed of a periodic and continuous pattern of light and dark shapes.

8. A printing method as claimed in claim 6, further comprising the step of generating a random pattern of light and dark shapes by changing a reading line at every line based on said stored minimum unit pattern data.

9. A printing method as claimed in claim 6, wherein a reading starting dot is changed at every line based on said stored minimum unit pattern data.

10. A printing method as claimed in claim 6, further comprising the step of storing a plurality of types of patterns of light and dark shapes, wherein one of said plurality of types of patterns is read by selection of an operator.

11. An image forming apparatus for forming an image on a printing sheet, said image forming apparatus comprising:

image transfer means for transferring a color image onto said printing sheet;

film transfer means for transferring a transparent sheet from an upper face of said printing sheet having said color image transferred by said image transfer means;

memory means for storing minimum unit pattern data representing a partial pattern of a pattern of light and dark shapes to be formed with respect to said transparent sheet to be transferred onto said printing sheet by said film transfer means; and control means for controlling said memory means so as to read said minimum unit pattern data of said memory means as lamination printing data and, using a predetermined algorithm to generate an entire pattern based on said minimum unit pattern data, controlling said film transfer means such that said transparent film transferred onto said printing sheet having said color image transferred thereon becomes a film having a surface with said pattern of light and dark shapes in accordance with said lamination printing data;

wherein said predetermined algorithm generates said entire pattern by looping memory addresses of said minimum unit pattern data when generating a flat pattern, a silk pattern, or an alternating flat/silk pattern, and wherein said predetermined algorithm generates said entire pattern by sequentially determining a random pattern of light and dark shapes on each printing line based on a predetermined ratio of light and dark shapes when generating a random entire pattern.

12. An a image forming apparatus as claimed in claim 11, wherein said control means includes means for performing said predetermined algorithm in which an arithmetic operation for determining which part of said minimum unit pattern data stored in said memory means is used as said lamination printing data is performed based on said minimum unit pattern data itself.

13. An image forming apparatus as claimed in claim 11, wherein said control means performs said predetermined algorithm and includes means for performing
   a first arithmetic operation for determining which data on a line of said minimum unit pattern data stored in said memory means is used as said lamination printing data, and means for performing
   a second arithmetic operation for determining which dot data on said line designated in said first arithmetic operation is set to a first dot data of said lamination printing data.

14. An image forming apparatus as claimed in claim 13, wherein said control means includes means for performing said first and second arithmetic operations by using data included in said minimum unit pattern data stored in said memory means.

15. An image forming apparatus as claimed in claim 11, wherein said lamination printing data is comprised of random data.

16. An image forming method for forming an image on a printing sheet, said image forming method comprising the steps of:
   forming a color image on said printing sheet;
   reading minimum unit pattern data stored in a memory as lamination printing data in accordance with a predetermined algorithm; and
   generating a transparent film having a pattern of light and dark shapes based on said lamination printing data onto said printing sheet having said color image formed thereon;
   wherein said predetermined algorithm generates an entire pattern by looping memory addresses of said minimum unit pattern data when generating a flat pattern, a silk pattern, or an alternating flat/silk pattern, and
   wherein said predetermined algorithm generates said entire pattern by sequentially determining a random pattern of light and dark shapes on each printing line based on a predetermined ratio of light and dark shapes when generating a random entire pattern.

17. An image forming method as claimed in claim 16, wherein said predetermined algorithm is an algorithm in which an arithmetic operation for determining which part of said minimum unit pattern data stored in said memory is used as said lamination printing data is performed based on said minimum unit pattern data itself.

18. An image forming method as claimed in claim 16, wherein said predetermined algorithm includes
   a first arithmetic operation for determining which data on a line of said minimum unit pattern data stored in said memory is used as said lamination printing data, and
   a second arithmetic operation for determining which dot data on said line designated in said first arithmetic operation is set to a first dot data of said lamination printing data.

19. An image forming method as claimed in claim 18, wherein said first and second arithmetic operations are performed by using data included in said minimum unit pattern data stored in said memory.

20. An image forming method as claimed in claim 16, wherein said lamination printing data is comprised of random data.

* * * * *